United States Patent Office 3,226,400
Patented Dec. 28, 1965

3,226,400
METHOD FOR THE MANUFACTURE OF PERCHLORODIPHENYLENE DIOXIDE
Josef Kaupp and Helmut Klug, Gersthofen, near Augsburg, Germany, assignors to Farbwerke Hoechst Aktiengesellschaft vormals Meister Lucius & Brüning, Frankfurt am Main, Germany, a corporation of Germany
No Drawing. Filed June 20, 1960, Ser. No. 37,114
Claims priority, application Germany, June 27, 1959, F 28,796
9 Claims. (Cl. 260—340.3)

The present invention relates to a method for the manufacture of perchlorodiphenylene dioxide.

The "perchlorodiphenylene dioxide," the exact structure of which is not yet known but which possesses an excellent stability is most likely an octachloro-diphenylene dioxide of the following structural formula

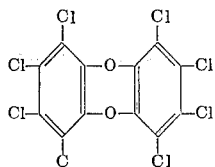

The known methods for the manufacture of the aforesaid compound only lead, however, to unsatisfactory yields.

It is known for a long time to prepare octachloro-diphenylene dioxide, for example, by continuously heating pentachlorophenol or by dry distillation of the potassium salt of pentachlorophenol. A further mode of formation, which has already been described, is the thermal decomposition of 2,3,4,4,5,6-hexachlorocyclohexadiene-(2,5)-one-(1), an isomer melting at 106° C. of the class of the so-called hexachlorophenols.

The statements made in literature about the pyrolysis of pentachlorophenol clearly show that this method is very uneconomical. In the course of a thermal decomposition of pentachlorophenol at 300° C. lasting for 24 hours, for example, the amount of octachloro-diphenylene dioxide obtained is about 6.9% by weight only, calculated on the weighed portion of pentachlorophenol used. As ascertained by own experiments the pyrolysis of the aforementioned 2,3,4,4,5,6 - hexachlorocyclohexadiene-(2,5)-one-(1) likewise gives unsatisfactory yields since the final products obtained after the completion of the reaction are contaminated with a high proportion (almost 50% by weight) of hexachlorobenzene. The latter is probably formed in the course of a decomposition, the mechanism of which is not yet exactly known, of the 2,3,4,4,5,6-hexachlorocyclohexadiene-(2,5)-one-(1) with simultaneous splitting off of phosgene.

It has now been found that octachloro-diphenylene dioxide can be obtained in an almost quantitative yield when, instead of pentachlorophenol or the salts thereof, especially the alkali metal salts, or 2,3,4,4,5,6-hexachlorocyclohexadiene-(2,5)-one-(1), mixtures of said two substances or mixtures of pentachlorophenol and octachlorocyclohexenone are heated to a temperature in the range from 150–300° C. and preferably 150–250° C., suitably with gradual increase of the reaction temperature with the indicated range, and thus subjected to pyrolysis. Instead of the 2,3,4,4,5,6-hexachlorocyclohexadiene-(2,5)-one-(1) it is likewise possible to use in this reaction the isometric 1,2,4,4,5,6 - hexachlorocyclohexadiene - (1,5)-one-(3) having a melting point of 51° C. which has been described by L. Denivelle and R. Fort. This result is surprising the more so as it is known, for example, that the pyrolysis of octachlorocyclohexenone at a temperature above 200° C. can be used for the preparative manufacture of hexachlorobenzene.

The process of the present invention offers, as compared with the known pyrolysis of pentachlorophenol, the advantage that considerably lower reaction temperatures, for example 250° C. or therebelow, can be applied, whereby the formation of undesired decomposition products and a possible discoloration of the final product are practically avoided to a greater extent. This is very important in view of the fact that octachloro-diphenylene dioxide is very sparingly soluble in the usual organic solvents and can be purified by recrystallization with difficulty only. For the rest the possible reduction of the reaction temperature considerably reduces the corrosion of the parts of the apparatus that come into contact with the chlorinated compounds.

The process of the invention is suitably carried out in a manner such that a proportion of 100 mols pentachlorophenol and 1–200, preferably 20–100 mols of isomers or isomer mixtures of the class of hexachlorocyclohexadienones or octachlorocyclohexenones are mixed and subjected to pyrolysis. It is of advantage to maintain the temperature in the first phase of the reaction, in which only hydrochloric gas is formed, below 200° C., preferably in the range from 150–180° C. and gradually to increase the temperature as soon as the evolution of gas subsides to about 230° C. In this following stage of the reaction free chloride is formed, depending on the amount of the hexachlorocyclohexadienone or octachlorocyclohexenone contained in the reaction mixture. The solidification of the reaction mass, which is due to the progressing formation of octachloro-diphenylene dioxide, indicates the end of the reaction which can be completed by a short after-heating to about 250° C. In general the reaction is terminated after a few hours, for example ½ to 5 hours. However, when a bulk of the above-mentioned mixture is pyrolyzed, the reaction may also last a considerably longer time. After having washed the comminuted final product one or several times with a suitable solvent which dissolves the starting components and the by-products formed in the reaction but does not attack substantially the perchlorodiphenylene dioxide, for example trichloroethylene, the octachloro-diphenylene dioxide is obtained in a form practically having the exact melting point.

It is likewise possible, of course, to use in the process of the present invention mixtures, such as have been obtained by direct chlorination of phenol and the composition of which corresponds to that of the mixtures used as starting material. Alternatively salts, especially alkali metal salts of pentachlorophenol, can be reacted with chlorine, whereby the condition of the simultaneous presence of free pentachlorophenol and hexachlorocyclohexadienone is also fulfilled. When in this case the aforesaid reaction temperature of above 150° C. is maintained octachloro-diphenylene dioxide is directly formed.

In some cases it is recommended to use concomitantly inert diluents or solvents which may be added to the reaction mixture either at the beginning, in the course or even towards the end of the reaction. As inert diluents or solvents are suitable, in general, those which do not undergo chemical reactions under the reaction conditions with the starting substances and the octachloro-diphenylene dioxide formed and the boiling point of which under the pressure applied is above the reaction temperature. It may, therefore, be of advantage to carry out the reaction under elevated pressure. As diluents or solvents there are mentioned by way of example the chlorination products of ethylene, butadiene, cyclopentadiene, of other aliphatic or cycloaliphatic hydrocarbons, of benzene, naphthalene, diphenyl, anthracene and indane or of other aromatic hydrocarbons or the substitution products thereof, such as aniline, especially penta- and hexachloroethane, hexachlorobenzene, pentachloroaniline, chloronaphthalene, perchlorobutadiene, and hexachlorocyclopentadiene. In the special case when the diluent is only added after the completion of the reaction there can also be used such substances as would normally react with chlorine, for example high boiling gasoline, tetra- and decahydronaphthalene, phthalic acid esters, hexamethylbenzene, glycol or glycerol. The working up of the substance mixtures obtained largely depends, of course, on the special properties of the inert diluent. In general, the solid reaction product is repeatedly washed with one of the aforesaid inert diluents or another substance which does not dissolve octachloro-diphenylene dioxide, if desired at elevated temperatures.

The octachlorodiphenylene dioxide obtained by the process of the present invention is suitable for flameproofing polyolefins, as additive in the manufacture of flame-proof coating compositions or high-duty lubricating or cutting oils, as intermediate products for the manufacture of pesticides, dyestuffs and pharmaceutical preparations, and in the molten state as thermostable heat carrier liquid.

The following examples serve to illustrate the invention but they are not intended to limit it thereto.

*Example 1*

In a three-necked glass flask a mixture of 200 grams (about 0.75 mol) pentachlorophenol and 75 grams 2,3,4,4,5,6 - hexachlorocyclohexadiene - (2,5) - one - (1) melting at 106° C. was heated to about 120° C. whereby it melted to yield a uniform liquid. The temperature of the red-brown melt was then increased to about 170° C. and gradually to 200° C., while a uniform hydrogen chloride current escaped. Heating was continued until after a further hour, during which chlorine was split off, the reaction mixture substantially solidified at a temperature of about 258° C.

After cooling, the crude reaction product was washed by intensely triturating it three times, each time with 150 cc. trichloroethylene, and dried. The practically colorless octachloro-diphenylene dioxide obtained after drying (193.6 grams) had a melting point of 330–333° C. The yield amounted to about 84% of the theory.

In a comparative pyrolysis of 301 grams (1 mol) 2,3,4,4,5,6 - hexachlorocyclohexadiene - (2,5) - one - (1) alone, during which the reaction temperature had to be increased to 290–300° C. in order to obtain a satisfactory yield, 91.2 grams of octachloro-diphenylene dioxide were obtained only, corresponding to 39.6% of the theory. The amount of undesired hexachlorobenzene was 147.8 grams.

*Example 2*

In the apparatus described in Example 1 a mixture of 222 grams (about 0.83 mol) pentachlorophenol and 62 grams (about 0.17 mol) of a crude octachlorocyclohexenone-isomer mixture having a melting point of 53–58° C. and being obtained by chlorinating phenol in the presence of antimony pentachloride, was first heated for about 30 minutes at 150–190° C. A strong but uniform evolution of hydrogen chloride took place. The whole was heated for a further 30 minutes to 230–240° C. and the reaction mixture solidified gradually to a substantially crystallized, solid mass, while a small amount of chlorine was simultaneously split off. The solid mass was washed three times with trichloroethylene as described in the preceding example, and then dried. The almost colorless residue (183.8 grams) of octachloro-diphenylene dioxide had a melting point of 329–330° C. The yield amounted to 79.8% of the theory.

*Example 3*

At a temperature below 100° C. 133.2 grams pentachlorophenol (½ mol) and 150.5 grams 2,3,4,4,5,6-hexachlorocyclohexadiene-(2,5)-one-(1) (½ mol) were dissolved in 71 grams hexachlorocyclopentadiene. The reaction was started by heating the mixture first to 150–200° C. and when the evolution of hydrogen chloride was terminated, the internal temperature was raised to 230–250° C. After having been reacted for one hour, the mixture was allowed to cool whereby already at a temperature below 240° crystallization of the octachloro-diphenylene dioxide set in. After cooling, the latter was filtered off with suction, washed with trichloroethylene in order to remove still adhering hexachlorocyclopentadiene and subsequently dried. The yield of octachloro-diphenylene dioxide amounted to 219 grams, corresponding to 87.7% of the theory.

We claim:
1. A method for the manufacture of perchlorodiphenylene dioxide which comprises pyrolyzing a mixture of (1) a member of the group consisting of pentachlorophenol, an alkali metal salt of pentachlorophenol and mixtures thereof, and (2) a member of the group consisting of the hexachlorocyclohexanedienones, the octachlorocyclohexenones and mixtures thereof at a temperature in the range of 150 and 300° C.

2. The method of claim 1, wherein the pyrolysis temperature is in the range of 150 and 250° C.

3. A method for the manufacture of perchlorodiphenylene dioxide which comprises pyrolyzing a mixture of (1) a member of the group consisting of pentachlorophenol, an alkali metal salt of pentachlorophenol and mixtures thereof, and (2) a member of the group consisting of the hexachlorocyclohexanedienones, the octachlorocyclohexenones and mixtures thereof during ½ to 5 hours to a temperature gradually increasing from 150 to 300° C.

4. The method of claim 6, wherein the inert diluent is a chlorinated hydrocarbon.

5. The method of claim 6, wherein the inert diluent is hexachlorocyclopentadiene.

6. A method for the manufacture of perchlorodiphenylene dioxide according to claim 1 wherein the pyrolyzing step is carried out in the presence of an inert diluent.

7. The method of claim 1 wherein the mixture of starting materials contains 100 mols of a member of the group consisting of pentachlorophenol, an alkali metal salt of pentachlorophenol and mixtures thereof; and 1–200 mols of a member of the group consisting of hexachlorocyclohexanedienones, octachlorocyclohexenones and mixtures thereof.

8. A method for the manufacture of perchlorodiphenylene dioxide which comprises pyrolyzing a mixture of 100 mols of pentachlorophenol and 1–200 mols of 2,3,4,4,5,6-hexachlorocyclohexandiene-(2,5)-one-(1) at a temperature rising from 120 to 300° C.

9. A process for the preparation of perchlorodiphenylene dioxide which comprises pyrolyzing a mixture of pentachlorophenol and hexachlorocyclohexanedienone at an elevated temperature.

References Cited by the Examiner
UNITED STATES PATENTS

| | | | |
|---|---|---|---|
| 981,348 | 1/1911 | Zaertling et al. | 260—340.3 |
| 2,662,918 | 12/1953 | Spaulding | 260—586 |

OTHER REFERENCES

Perry: "Chemical Engineer's Handbook" 3rd edition, page 289 (1950).

Sandermann et al.: "Chem. Ber." vol. 90, pp. 690-2 (1957).

NICHOLAS S. RIZZO, *Primary Examiner.*

H. J. LIDOFF, IRVING MARCUS, DUVAL T. McCUTCHEN, *Examiner.*